(12) United States Patent
Widderich et al.

(10) Patent No.: US 12,196,191 B2
(45) Date of Patent: *Jan. 14, 2025

(54) SYNCHRONIZING JOINT

(71) Applicant: Danfoss Power Solutions GmbH & Co OHG, Neumünster (DE)

(72) Inventors: Jan Widderich, Nordborg (DK); Hauke Marsch, Traventhal (DE); Björn Dörntge, Nordborg (DK)

(73) Assignee: DANFOSS POWER SOLUTIONS GMBH & CO OHG, Neumünster (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/307,047

(22) Filed: Apr. 26, 2023

(65) Prior Publication Data
US 2023/0265838 A1 Aug. 24, 2023

Related U.S. Application Data

(63) Continuation of application No. 16/658,528, filed on Oct. 21, 2019, now Pat. No. 11,879,443.

(30) Foreign Application Priority Data

Oct. 22, 2018 (DE) .......................... 102018218040.7

(51) Int. Cl.
*F04B 1/2085* (2020.01)
*F04B 1/328* (2020.01)
*F16D 3/205* (2006.01)
*F16D 3/24* (2006.01)
(Continued)

(52) U.S. Cl.
CPC ............ *F04B 1/2085* (2013.01); *F04B 1/328* (2013.01); *F16D 3/205* (2013.01); *F16D 3/2055* (2013.01); *F16D 3/24* (2013.01); *F04B 1/24* (2013.01); *F04B 1/324* (2013.01); *F16C 2360/00* (2013.01); *F16D 2300/12* (2013.01); *Y10S 464/905* (2013.01)

(58) Field of Classification Search
CPC .......... F04B 1/2085; F04B 1/328; F04B 1/24; F04B 1/324; F16D 3/205; F16D 3/2055; F16D 3/24; F16D 2300/12; F16C 2360/00; Y10S 464/905
See application file for complete search history.

(56) References Cited

U.S. PATENT DOCUMENTS 5,171,185 A * 12/1992 Schneider ............. F16D 3/2055
464/111
6,505,541 B2 * 1/2003 Skirde ..................... F04B 1/328
91/505
(Continued)

*Primary Examiner* — Greg Binda
(74) *Attorney, Agent, or Firm* — McCormick, Paulding & Huber PLLC

(57) ABSTRACT

A joint for the angularly adjustable drive-connection of a cylinder block and a driveshaft of a hydrostatic bent axis piston unit. The joint has a shank which is rotatable about its longitudinal axis defining a joint axis, on both ends of the shank roller carriers project radially and basically perpendicular to the joint axis. On each roller carrier a roller is provided rotatable around a roller axis. The rollers are secured in axial direction against slipping-off of the roller carriers by means of an embossed area located axially outside of the roller on the respective distal end portion of the roller carrier.

23 Claims, 5 Drawing Sheets

(51) Int. Cl.
  *F04B 1/24* (2006.01)
  *F04B 1/324* (2020.01)

(56) References Cited

U.S. PATENT DOCUMENTS 8,210,952 B2 * 7/2012 Yamase .................. F16D 3/2052
                                                              464/111
11,879,443 B2 * 1/2024 Widderich .............. F16D 3/205

* cited by examiner

SYNCHRONIZING JOINT

CROSS-REFERENCE TO RELATED APPLICATIONS

This application is a continuation of U.S. patent application Ser. No. 16/658,528, filed on Oct. 21, 2019, now U.S. Pat. No. 11,879,443, which claims foreign priority benefits under 35 U.S.C. § 119 to German Patent Application No. 102018218040.7 filed on Oct. 22, 2018, the contents of each of which are hereby incorporated by reference in their entirety.

TECHNICAL FIELD

The invention relates to a synchronizing joint for the angularly adjustable drive connection of a driveshaft to a cylinder block of a hydrostatic bent axis axial piston unit. The invention in general relates to a universal joint for the angularly drive connection of two driveshafts.

BACKGROUND

In the following the invention is descript by the help of a hydrostatic bent axis axial piston unit, exemplarily for a multitude of possible uses for universal joints. A person skilled in the art will easily detect that the inventive idea is applicable in general to all kind of universal joints for the angularly drive connection of two driveshafts whose driveshaft axes are not aligned, and wherein the distance of the driveshaft ends facing each other changes with the variation of the angle between the driveshaft axes. In particular universal joints are used in hydrostatic propel units of the bent axis type of construction in order to achieve a reliable, robust, smooth running and cost effective connection of the main rotating parts, i.e. the cylinder block and the driveshaft, both being arranged in operation of the hydrostatic bent axis axial piston unit in an angularly position to each other, i.e. the so-called displacement angle which can be either fixed or adjustable, depending on the type of construction.

Hydrostatic bent axis axial piston units have a cylinder drum which is mounted so as to be rotatable about its longitudinal central axis and has cylinder bores distributed over its periphery. In these cylinder bores working pistons are movable reciprocally. Hydrostatic bent axis axial piston units of this type can be used as pumps or motors. In order to adjust the displacement volume of the unit, the cylinder block can be pivoted about a pivot axis which runs transversely with respect to the rotational axis of the cylinder block. As a result of which the longitudinal central axis of the cylinder block forms an adjustable angle with the axis of the driveshaft. The working pistons are articulately supported on a drive flange of the driveshaft at an adjustable angle. Another connection between the cylinder block and driveshaft is produced by means of a synchronizing joint—a particular embodiment of a universal joint—ensuring the rotational synchronization between the cylinder block and the driveshaft. On the ends of the synchronizing joint at the driveshaft side and at the cylinder block side in each case laterally projecting roller carriers are provided which each define an axis for rollers which are provided on the roller carriers. The rotational axis of the rollers runs approximately at right angles to the synchronizing joint axis. In general the rollers are provided for ensuring a smooth displacement capability of the cylinder block with respect to the driveshaft, i.e. a smooth articulation capability, when the displacement angle between the driveshaft and the cylinder block is changed. When changing the displacement angle distance variations between the cylinder block and the driveflange occur, in particular for all points lying outside of the cylinder block central axis. These distance variations between the cylinder block and the driveshaft/driveflange have to be compensated by pivot movements of the synchronizing joint, wherein the synchronizing joint, is in its most inserted position in the driveshaft or the cylinder block at a displacement angle of cero degrees and is in its most outside position at maximum displacement angle. This inside-out and vice versa pivot movement have to be as smooth as possible to reduce the displacement forces.

The synchronizing joint also serves to ensure the torque transmission between the shaft and the cylinder block in order to free the working pistons from lateral forces as much as possible, which is valid in particular when the hydrostatic bent axis axial piston unit is operated in pump mode, i.e. when the driveshaft is driven externally. Even though high torques in all operation condition can occur at the synchronizing joint in the event of, for instance, inhomogeneous loads or pressure pulses or in the event of hydraulic retardation of the cylinder drum with respect to the driveshaft.

The synchronizing joint is therefore embodied as a joint with which the required longitudinal compensation as well as transmission of high torques can be provided in a reliable manner. For this purpose, the synchronizing joint has a substantially cylindrical shank, wherein at the two ends of which in each case one connecting pin is provided. One of which is basically aligned in the direction of the cylinder block central axis and the other one in axial direction of the driveshaft. By means of the connecting pins the synchronizing joint bears angularly compensated under spring load at one side against the cylinder block and at the other side against the driveshaft. Said pressure spring additionally has the task of applying the necessary force for sealing off the rotating cylinder drum with respect to the non-rotating valve segment. This applies in particular to the unpressurized state, for example when the motor is started up. Said spring forces must in any case be transmitted by the synchronizing joint. On account of the kinematics during the pivoting of the cylinder drum, it is necessary for the roller carriers to be designed such that the mobility of the rollers on the roller carriers is ensured. The angular compensation of the synchronizing joint with respect to the cylinder block axis and the driveshaft axis is generally achieved in that the connecting pins comprise at that end facing the synchronizing joint a spherical surface which abuts against a correspondent concave seat on the synchronizing joint.

The torque transmitting capability of the synchronizing joint is ensured by the roller carriers bearing slide rollers for ensuring the above descript pivot movement of the synchronizing joint when the displacement angle of the hydrostatic bent axis axial piston unit is changed. Other state of the art hydrostatic bent axis axial piston units use a cardan joint which is a special universal joint not capable to compensate distance variations, instead of the synchronizing joint according to the invention. As a cardan joint bears the disadvantage of not being capable of compensating for distance changes, this have to be provided in a different manner, for instance, by the help of a splined shaft or somehow else. It is obvious for a skilled person that using a splined shaft for pivot movement does not offer an optimum result.

Hydrostatic bent axis axial piston units using a synchronizing joint of the described type are known, for example, from the company document Danfoss—H1 Bent Axis Motors, Technical Information, pages 6 & 7, March 2018.

The assembly or disassembly of the synchronizing joint, however, is relatively complex because the multitude of components, in particular the rollers and connecting pins, which are finally fixed when having reached their designated position in the assembled hydrostatic bent axis axial piston unit. Therefore, for assembly reasons, all the parts have provisionally fixed together before assembling, e.g. using auxiliary means for assembly. A conventional means is grease which temporarily holds/adheres the parts in position and is washed away by surrounding oil when the hydrostatic bent axis axial piston unit is set in operation. As a result of which the hydraulic fluid/oil and the filter required for cleaning the hydraulic fluid are contaminated. Further, grease is a dirt magnet bringing-in eventually dirt into the hydrostatic bent axis axial piston unit when assembling the unit or holding back wear particles which normally are flushed out of the unit. For a better dissolving of the grease, light-type greases, like Vaseline, are used having the disadvantage that their adhering properties are relatively low, such that the rollers tent to drop-down during the assembly process. This will cause an undesired breakdown in operation of hydrostatic bent axis axial piston unit.

From DE 10 2007 051 369 B4 published also as US 2009/0111591 A1 an additional securing elements are known, two of which are provided at the two ends of the cylindrical shank in order to prevent the rollers from sliding off of the roller carriers by means of a Snap-On connection.

SUMMARY

The aim of the invention is to create an assembly-friendly universal joint, in particular a synchronizing joint for a hydrostatic bent axis axial piston unit which does not contaminate the hydraulic fluid, wherein the rollers are hold securely against drop-off of the roller carriers during handling and assembling processes of the universal joint, in particular the synchronizing joint to a hydrostatic bent axis axial piston unit. It is also object of the invention to provide a cost-effective, simple applicable and robust solution which works for all type of bent axis axial piston units and which does not affect negatively the lifespan of the hydrostatic bent axis axial piston unit.

According to the invention, the aim is achieved with a universal joint as disclosed herein and in particular in connection with a synchronizing joint for an hydrostatic bent axis axial piston unit known from DE 10 2007 051 369 B4 already mentioned before. The inventive universal/synchronizing joint differs from the known synchronizing joint, in that the rollers are secured in axial direction against slipping-off of the roller carriers by means of an embossed area, which, with respect to the longitudinal synchronizing joint axis, is located/applied axially outside of each roller on the respective/associated roller carrier. In the following the invention is described exemplarily by the help of a synchronizing joint for a hydrostatic bent axis axial piston unit, however, as already stated above, the invention is not limited to such synchronizing joints and can be applied as well to any universal joint comprising at least one roller carrier on which a roller can be mounted rotatable.

According to the exemplarily chosen embodiment the shank of a synchronizing joint in its assembled position between cylinder block and the drive shaft is rotatable around a longitudinal axis which, at displacement angle not equal to cero, does not coincide neither with the cylinder block axis nor the drive shaft axis. In order to physically connect the shank to both the cylinder block and to the drive shaft connecting pins with spherical ends are used preferably. Accordingly, the shank, the cylinder block as well as the drive shaft show concave supporting areas in which the connecting pins are supported pivotable, however capable of transmitting generally axial forces for maintaining a closed contact between the cylinder block and the valve segment or pressure plate, respectively. This is particularly important at low revolution speeds or at standstill of the hydrostatic bent axis axial piston unit in order to reduce losses due to leakage. This is particular possible as no relative rotational speed difference between the drive shaft, the connecting pins, the shank and the cylinder block occurs during operation of the hydrostatic bent axis axial piston units.

For a person skilled in the art it is conceivable that by means of such a synchronizing joint a variable adjustable hydrostatic bent axis axial piston displacement unit is achieved, wherein the working pistons are generally free from circumferential forces, or in other words, the circumferential forces on the working pistons is minimized by, for instance in a preferred embodiment, a double tripod-like design of the shank, wherein each of the legs (roller carrier plus roller) is guided in a corresponding groove (seat) in the cylinder block or in the drive shaft, respectively. In order that the synchronizing joint can be pivoted with respect to the drive shaft and the cylinder block, when the cylinder block tilt angle is changed, the tripod-like extensions of the shank are provided with rollers to facilitate this relative, curved motion of the shank relative to the cylinder block and the drive shaft. As there are no relative rotational speed differences between the axes of the shank, the driveshaft and the cylinder block, the rollers on the roller carriers do not require a sophisticated bearing, such that a sliding contact bearing will suffice. However, when the displacement angle of the cylinder block with respect to the drive shaft is changed, the synchronizing joint motion should show very low forces along raceways longitudinal formed on seats in the drive shaft and/or cylinder block. With these inside-out movements of the synchronizing joint, i.e. the curved shank motion, distance compensation is provided too. As the shank is provided with at least one roller on a roller carrier on each side of the shank each roller on its roller carrier is preferably to be lubricated. This can be achieved by guiding "leakage" fluid from the valve segment to the seats of the rollers in the cylinder block and/or the driveshaft.

According to the invention the rollers are secured in axial direction against slipping-off of the roller carriers by means of an embossed area. The embossed area is located with respect to the joint axis on the respective roller carriers and located axially outside of the corresponding roller. In a preferred embodiment of the synchronizing joint the shank shows three cylindrical extensions arranged circumferentially around each end portion of the shank. In this preferred embodiment the shank comprises in total six rollers carriers which are cylindrically formed in order that each roller carrier receives a roller thereon. The rollers are capable to rotate around the cylinder axis of the roller carriers and are secured against slipping-off of the roller carriers by means of the before mentioned embossed area.

The embossed areas are located at the free distal end areas of the roller carriers and are applied to the roller carriers after placing the roller on the roller carrier. Once the roller is placed on the roller carrier the embossed area is realized such that the roller is prevented from dropping-off of the roller carrier.

According to the invention the embossed area constitutes a locally limited area in which the diameter of the in general cylindrically formed roller carrier is increased such that the roller is prevented from slipping-off of the roller carrier.

Hence, the embossed area locally enhancing the outer diameter of the roller carrier should be in this area at least equal than the internal diameter of the corresponding roller or slightly bigger. The embossed area should be in axial direction big enough to ensure that the roller cannot slip-off of the roller carrier, however small enough that the roller can turn on the roller carrier, wherein the axial length of the roller carrier need not to be increased compared to roller carriers of already existing synchronizing joints.

Thereby the embossed area can be performed with any suitable means known from the state of the art. In preferred embodiments the embossed area can be applied to the roller carrier for example by a welding point, a welding dash or a welding line, e.g., applied along the circumferential direction on the respective distal ends of the roller carriers or can simply be a burr or a splint or an O-ring.

In a preferred embodiment of the invention the embossed area can be a laser welding point a laser welding dash or a laser welding line. This embossed area can be brought-up onto the roller carrier by means of laser application, however, one can imagine also the addition of material by soldering, welding, sputtering, gluing and any other technology, which increases locally the diameter of the roller carriers at its distal ends. Preferably the embossed area is formed by laser application forming a laser point, a laser dash or a laser line, as this does not introduce any additional material to the synchronizing joint during the mounting step of the synchronizing joint and hence reduces the risk of introducing dirt into the hydraulic unit. Further, by using a laser application, assembling time is saved and the presence of e.g. a laser point or dash can be controlled easily by visual appearance on the surface. A further advantage of laser application lies in the fact that no high amounts of energy are introduced to the roller carriers such that heat deformations or mechanical deformations to the roller carriers are avoided. A further advantage lies in the fact that no additional material is added to the synchronizing joint, which also eliminates the risk from separating during use of the hydrostatic bent axis axial piston unit.

By the inventive idea other imaginable solutions for in general securing a turnable ring on a shaft, like a snap ring or a stopper fixed in the outer end area of the roller carrier are covered by the invention, too. For all solutions imaginable by a person with skills in the relevant art it have to be fulfilled that after applying the embossed area onto the roller carrier to prevent slipping-off of the roller from the roller carrier, the roller has to be still rotatable, and that the embossed area on the roller carrier shows an axial diameter equal or bigger than the internal diameter of the roller. Needless to say that the outer diameter of the embossed area should be smaller than the outer diameter of the roller in order that the roller can roll inside its corresponding raceway in the cylinder block or the drive shaft, respectively. Further, it is sufficient that the embossed area do not run along the whole circumferential length of the roller carrier. Part of the circumferential length, especially when a laser application is used, is enough for holding the roller on the roller carrier during the assembly of the joint to the machine.

Another advantageous point using a laser application is given in that no mechanical processing—with its correspondent preparation for mechanical processing—is necessary. Furthermore, laser application can be performed on nearly every material simply by adjusting the applied power. This eventually also allows for the use of plastic materials for the shank, however in most hydraulic bent axis axial piston units a shank made of metal is preferred due to the high moment to be transmitted as well as axial and radial forces which are applied to the shank. Independently which material is used for the shank the rollers itself can be made of plastic material as the load on the same during operation of the hydraulic bent axis axial piston unit are lower. Here also the use of a laser for applying the embossed area on the roller carriers may be preferred, as deformation energy for building the embossed area is introduced to the roller carriers locally only.

Only at 0°-degree displacement angle the roller axis is perpendicular with respect to cylinder block axis and also with respect to the drive shaft axis, hence the external circumferential surface of the rollers show preferably a convex shape in order to provide at any displacement angle of the hydrostatic bent axis axial piston unit a sufficient big abutment area. Preferably the roller carriers are formed integrally with the shank showing an in general cylindrical circumferential surface on which the rollers showing internally also a circumferential cylindrical shape are mounted. Preferably there is a slight gap between the internal cylindrical surface of the rollers and the external cylindrical surface of the roller carriers in order that the rollers can turn on the roller carriers. In a preferred embodiment the cylindrical roller carriers show in direction of the cylinder axis a throughhole which connects with a longitudinal bore along the shank axis in order to bring lubrication fluid nearby the gap between the rollers and the roller carrier. This lubrication fluid is preferably taken from the central part of the cylinder block on the surface connecting with the valve plate and is guided through a longitudinal bore through the cylinder block to the connecting pin connecting a cylinder block with the shank. From the shank longitudinal bore this lubrication fluid or leakage fluid can be guided further to the roller carriers beneath the cylinder block and the roller carriers beneath the drive shaft.

Further preferably this lubrication fluid or leakage fluid is guided further by the second connecting pin connecting the shank with the drive shaft in order to lubricate the support of the synchronizing joint in the drive shaft. As this is preferably configured preferably as an elastic support showing a pressure spring, which pressure spring is elastically prestressed in the assembled condition of the hydrostatic bent axis axial piston unit and transmits pressure forces, e.g., via a slider on the connecting pin which connects with the shank, the slider should be lubricated for easy movement. This lubrication channel coming from the contact surface of the cylinder block with valve plate passing through the connection pins and the shank and onto the slider can be extended in a further preferred embodiment also to the external surface of the drive shaft in order to lubricate the drive shaft bearings.

As described above in general, by means of the inventive synchronizing joint a simple, robust and economic solution for providing an easy assemble of the (pre-)mounted synchronizing joint to a hydrostatic bent axis axial piston unit is provided. Wherein the rollers on the roller carriers of the shank are secured such that dropping-off of the rollers is prevented especially when the synchronizing joint is handled in the assemble process of the hydrostatic bent axis axial piston unit. With the inventive synchronizing joint an automatic assembling of the synchronizing joint is possible as the rollers are prevented from slipping-off of the roller carriers.

A person skilled in the art will transfer easily all the above given explanation also to a basic universal joint comprising at least one roller on a roller carrier. Such a basic universal joint can be used, for instance, by joining two not aligned driving shafts, wherein one end of one shaft is formed as the above descript shank showing the at least one roller carrier with a roller mounted thereto and which is hold in place by an embossed area according to the invention. Following this, the end of the other shaft comprises a corresponding seat for the reception of the roller hold in place by the inventive embossing area applied on the distal end of the at least one roller carrier. Hence, the invention provides also for general universal joints a simple and reliable manner of (pre-) mounting the rollers on the roller carriers in order to simplify the assembly process of two shafts which in operation need not to be aligned to each other, as this for example occurs in the driven or non-driven axles of vehicles having independent suspension.

BRIEF DESCRIPTION OF THE DRAWINGS

The invention is shown below by the help of preferred embodiments of the above-mentioned synchronizing joint in more details which are shown in the attached Figures for exemplary purposes only and do not limit the scope of the invention, in particular not to the application of the inventive idea to synchronizing joints only. Further embodiments and modification of the embodiments and the inventive idea, which are within the knowledge of a person with skills in the relevant art are covered by the invention also, likewise combinations thereof. The Figures show.

DETAILED DESCRIPTION

Figure 1:
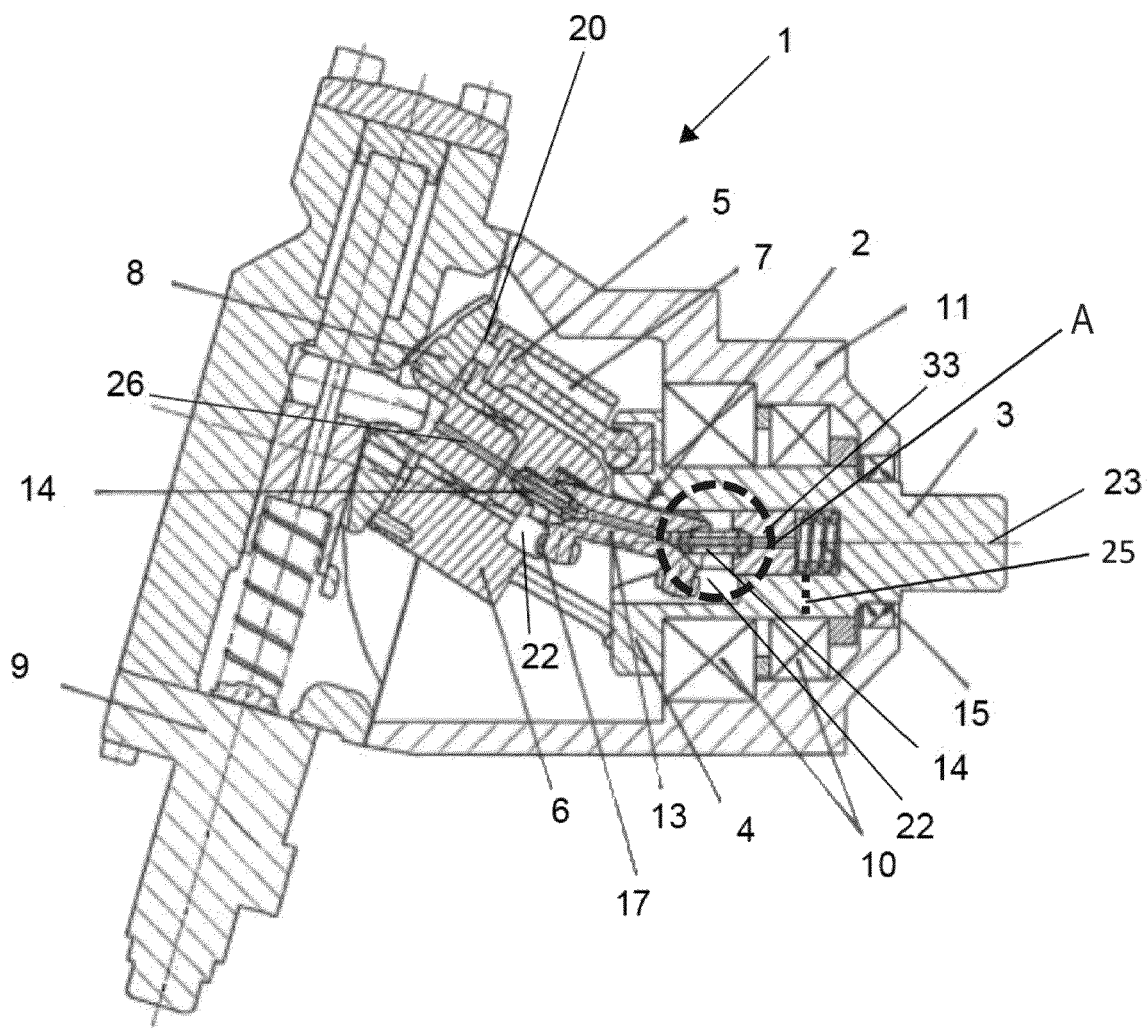
FIG. 1 shows a hydrostatic bent axis axial piston unit according to one embodiment of the invention in a sectional cut.

FIG. 1 illustrates a hydrostatic bent axis axial piston unit 1 according to the invention in the form of a hydraulic motor in a sectional view. The unit can fundamentally also be operated as a pump. As one embodiment, the hydrostatic bent axis piston unit 1 is of the variable adjustable displacement type of construction. The hydrostatic unit 1 has a cylinder block 6 which is mounted so as to be rotatable about its cylinder block axis 26 and has cylinder bores 7 distributed about its periphery, in which pistons 5 are movable. The cylinder block 6 is mounted in a housing 11 so as to be pivotable about a pivot axis which runs transversely with respect to its cylinder block axis 26, so that the cylinder block axis 26 of the cylinder block 6 forms an adjustable angle with the driveshaft axis 23 of the driveshaft 3 which itself is mounted transversally fixed and rotatable free in driveshaft bearings 10 mounted in the housing 11. The pistons 5 are articulately supported on the drive flange 4 of the driveshaft 3 at a settable angle. The adjustment of the displacement volume takes place by means of an adjusting device 9, by means of which a valve segment 8 which is attached to the cylinder block 6 can be pivoted. According to certain embodiments, the cylinder block 6 of the hydrostatic bent axis piston unit 1 can be swivelled to positive and negative displacement angles by means of an adjustment unit 9.

The drive connection, i.e. the torque transmission between the cylinder block 6 and the driveshaft 3 is produced by means of a synchronizing joint 2 which is embodied exemplarily as a double tripod joint. Said synchronizing joint 2 has a substantially cylindrical shank 13 which is mounted at its ends in each case by means of rollers 17 in the drive flange 4 and in the cylinder block 6, and is biased against the drive flange 4 and the cylinder block 6 connecting pins 14 under spring loading by a pressure spring 15. In the driveshaft 3 and in the cylinder block 6 raceways 22 are formed for the rollers 17, which raceways 22 are designed such that the synchronizing joint 2 is displaceable in each case axially in the driveshaft 3 and axially in the cylinder block 6. For this purpose, the rollers 17 have a spherical outer shape. In this way, length compensation can take place for different pivot angles. The pressure spring 15 is installed in the driveshaft 3. The pressing force of said pressure spring 15 is transmitted via the two connecting pins 14 and the shank 13 of the synchronizing joint 2 to the cylinder block 6 in order to maintain a close contact of the upper end of the cylinder block 6 with the pressure plate 20 and the valve segment 8 even at low revolution speeds or even at standstill of the hydraulic unit 1. Thus, according to certain embodiments, a hydrostatic bent axis piston unit 1 having a cylinder block 6 and a driveshaft 3 connected by synchronizing joint 2, is usable as hydrostatic bent axis piston pump or hydrostatic bent axis piston motor.

Figure 2:
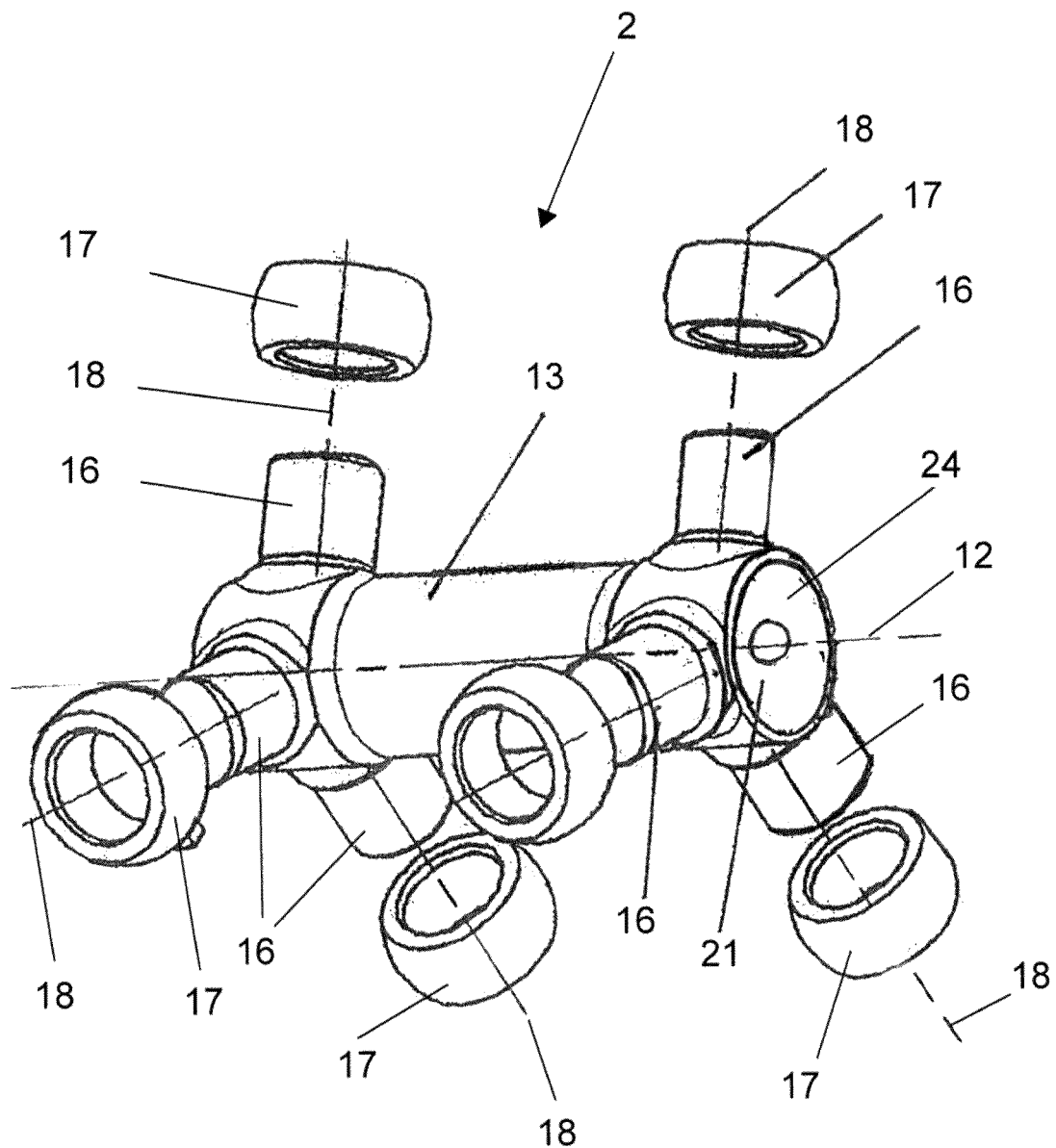
FIG. 2 shows a synchronizing joint according to the invention in a perspective exploded view in the non-assembled state.

As illustrated in the exploded view of FIG. 2, the synchronizing joint 2 which is embodied exemplarily as a double tripod joint, and is composed substantially of two three-arm stars and a cylindrical shank 13 which connects the two three-arm stars to one another. For this purpose, the shank 13 which is aligned in the direction of the joint axis 12 has at its two ends in each case three roller carriers 16 forming the three-arm star. The roller carriers 16 in each case define a roller axis 18, which is aligned in general perpendicular to the joint axis 12, for receiving the rollers 17 by means of which the synchronizing joint 2 is mounted at the one side in the driveshaft flange 4 of the driveshaft 3 and at the other side in the cylinder block 6. The synchronizing joint 2 is supported physically on one side to the cylinder block 6 and on the other side to driveshaft 3 by means of in each case one connecting pin 14 (not shown in FIG. 2) abutting each against a concave seat 24 formed at the end areas of the shank 13. The connecting pins 14, as shown in FIG. 1, are hold against the synchronizing joint 2 under the force of the pressure spring 15 (also not shown in FIG. 2) which is provided concentrically in the driveshaft 3. The roller carriers 16 are offset with respect to one another by in each case 120° and project perpendicularly from the shank 13.

It is obvious for a person skilled in the art that the double tripod depicts merely one possible embodiment for a synchronizing joint 2 and that various other possibilities of one-arm, two-arm, four-arm or more arm stars at the synchronizing joint 2 is viable, wherein a non-symmetrical design also viable, i.e. different numbers of arms on both sides of the shank 13. In order to prevent the rollers 17 from sliding-off the roller carriers 16 embossed areas 19 will be realized on each roller carrier 16 after the roller 17 is placed over the roller carrier 16. As FIG. 2 show an exploded view of the inventive synchronizing joint 2 and hence the rollers 17 are not placed already at their final destination, the embossed areas 19 (see FIG. 3) are still not applied. For applying the embossed areas 19 the axial length of the cylindrical roller carriers 16 is slightly bigger than the axial length of the rollers 17 such that the embossed areas 19 can be realized axially outside of the rollers 17—seen in axial direction of the roller carriers 16.

Figure 3:
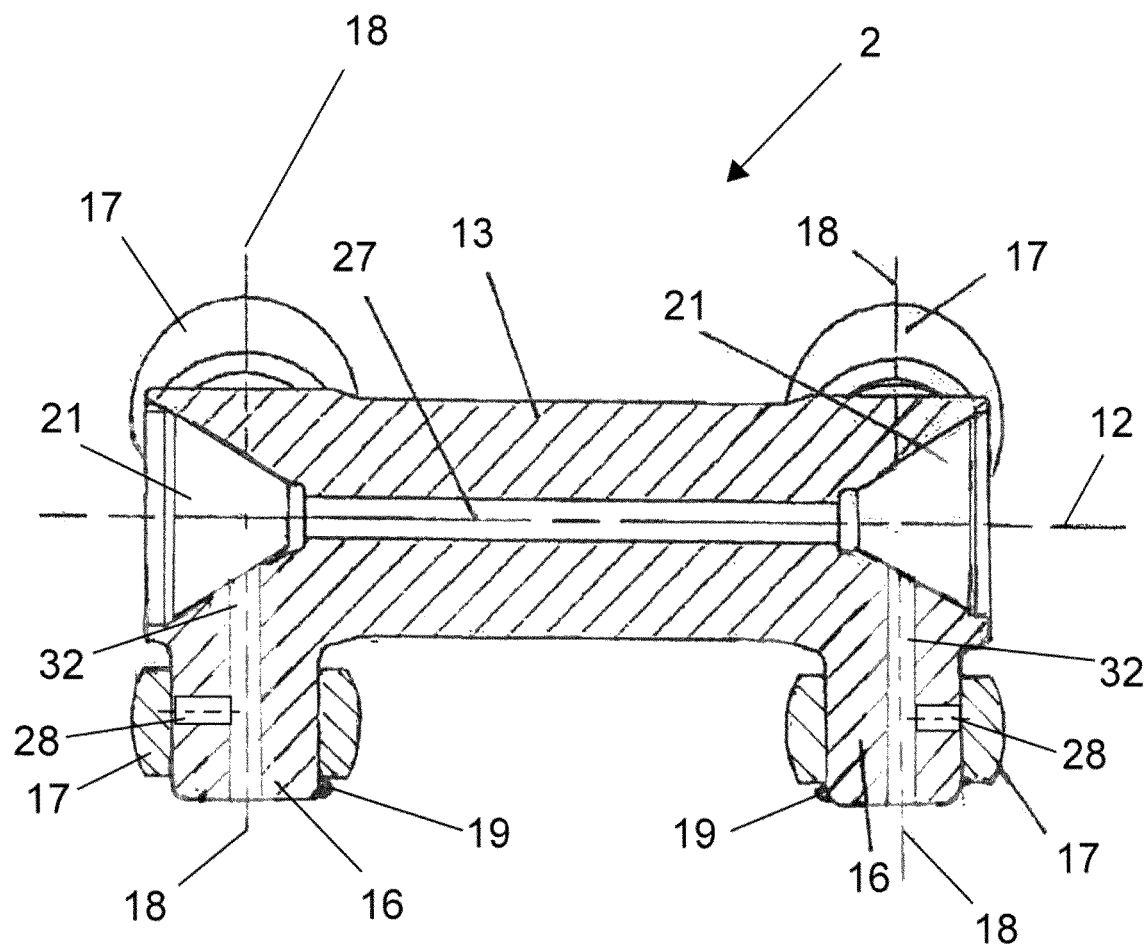
FIGS. 3 and 3A show a synchronizing joint in the assembled state in a sectional cut.

FIG. 3 shows the mounted—ready for assembling—state of the synchronizing joint 2 in longitudinal section. Illustrated are the roller carriers 16 which are formed integrally with shank 13 and to which the rollers 17 are attached in a displaceable fashion. Here, the rollers 17 are rotatable about the roller axis 18. With reference number 19 the embossed areas are depicted. This illustration of the embossed areas 19 is exaggerated and for illustration purposes only, in particular for the version where the embossed area is brought-up by laser application onto the distal end portion of the outer surface of the roller carriers 16, the embossed areas 19 would be very much smaller, just enough to prevent the rollers 17 from slipping-off. In this case the maximum radial height of the embossed area 18—seen perpendicular to the roller axis—would be, for instance, in the range of 0.1 mm to some tenth of mm only. Just enough to hold the roller 17 on the roller carrier 16 until the synchronizing joint 2 is assembled into the hydrostatic bent axis axial piston unit 1. According to some embodiments, the embossed area 19 is a welding point, a welding dash or a welding line along the circumferential direction of the roller carrier 16 or a burr. Further, according to some embodiments, the embossed area 19 is brought up by means of laser application, soldering, welding, sputtering, gluing or any other technology increasing locally the diameter of the roller carrier 16.

Figure 3A:
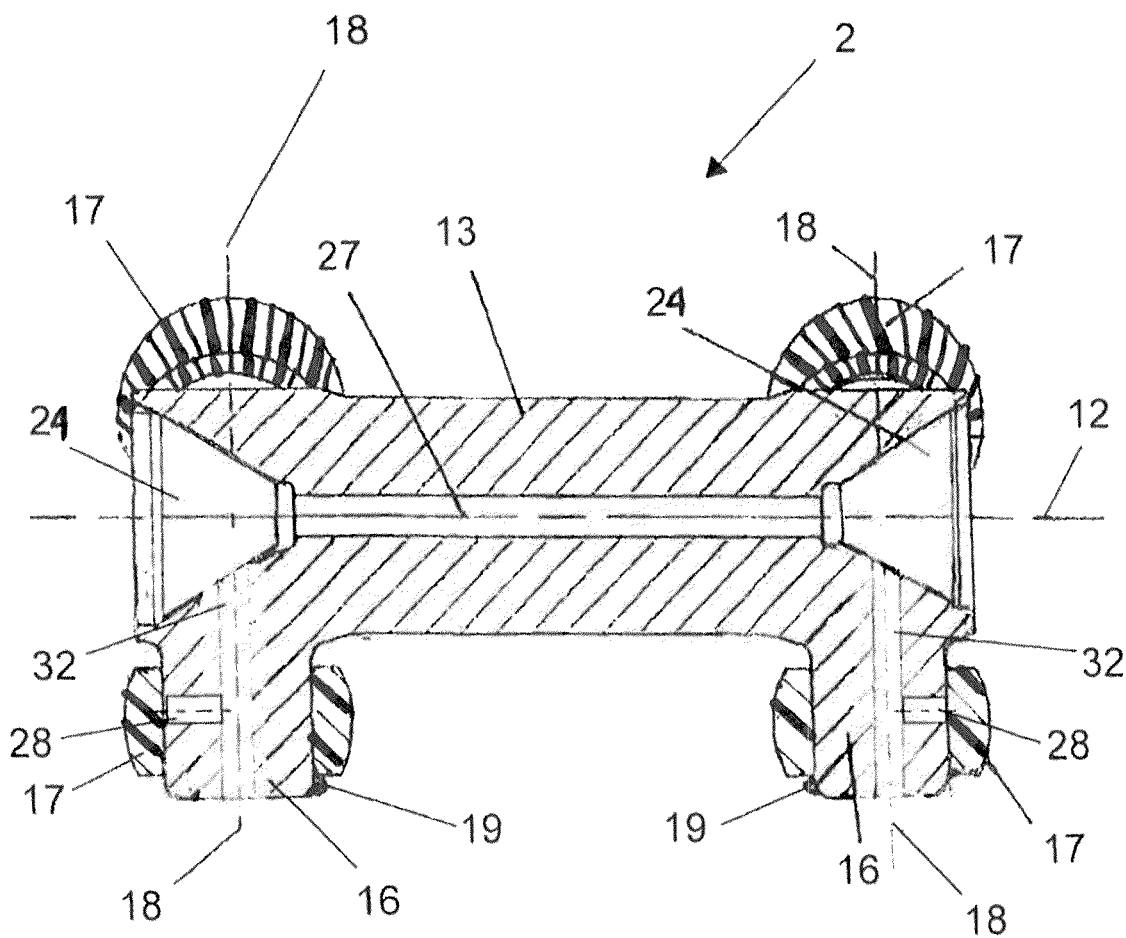
Figure 4:
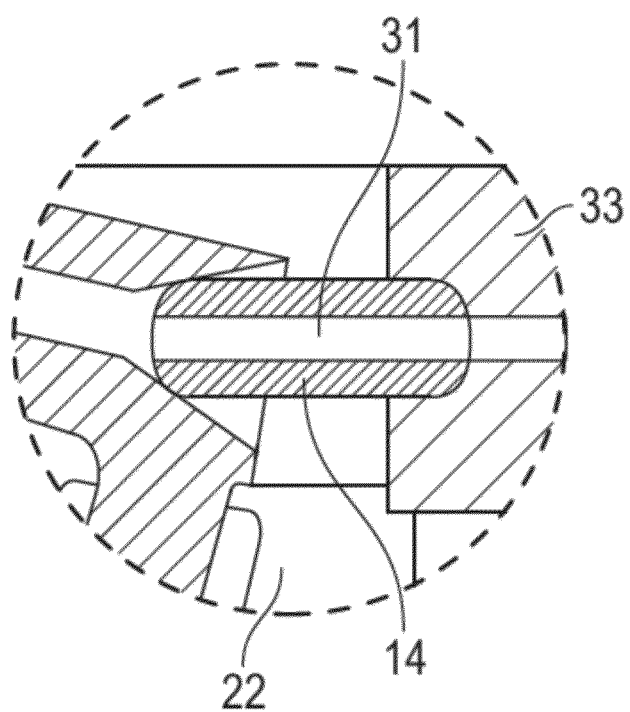
FIG. 4 is an enlarged view of detail A as shown in FIG. 1 of an embodiment of shank 13 and connecting pin 14.

It is therefore possible during assembly for the synchronizing joint 2 to be handled as a modular unit without the risk that the rollers would slide-off of the roller carriers 16. The base body of the joint, i.e. the shank 13 with the roller carriers 16 can be produced as a single cast part or a forged part, as illustrated in FIG. 3. The embossed areas 19 on the roller carriers 16 as well as the roller 17 should be sufficiently stable to withstand the temperatures which occur in the power unit, and must be sufficient abrasion-resistant because any abrasion debris caused by the curved movement of the synchronizing joint 2 transmitted to the rollers 16 would pass directly into the system by means of the surrounding oil. The roller 17 can for example be produced from plastic material (see, e.g., FIG. 3A). Injection moulding could be suitable for the production process of the rollers 17. Metallic materials such as steel or bronze are likewise suitable and can be correspondingly processed in a punching and bending process.

The shank 13 comprises at both end sides a conical recess in form of a concave seat 24 in which, for instance, a spherical or conical head of the connecting pins 14 can abut. According to some embodiments of the hydrostatic bent axis piston unit 1, the radial bores in the driveshaft 3 are capable to guide lubrication fluid from the connecting pins 14 to shaft bearings 10 rotatably supporting driveshaft 3 in a housing 11 of the hydrostatic bent axis piston unit 1. According to certain embodiments of the hydrostatic bent axis piston unit 1, the connecting pins 14 comprise through holes 31 capable to guide lubrication fluid from the cylinder block 6 to the longitudinal bore 27 in the shank 13 and from the shank 13 to the driveshaft 3 and vice versa. The longitudinal bore 27 in shank 13 ensures a sufficient supply with lubricating oil for the connecting pins 14 and further on to the slider 33 (see FIG. 1) which abuts against pressure spring 15. As best can be seen from FIG. 3 transversal bores 32 along the axial direction of the roller carriers 16, which are connected to the longitudinal bore 27 of the shank 13, provides for lubrication of the rolling movement of the rollers 17 on the roller carriers 16. Further, according to certain embodiments, the synchronizing joint 2 includes radial bores 28 in the roller carriers 16 connect radial to the roller axis 18 oriented transversal bores 32 in the roller carriers 16 such that lubrication fluid from the longitudinal bore 27 in the shank 13 is capable to be guided to the rollers 17. Radial bores (schematically shown in FIG. 1 as item 25) in the driveshaft (3) are capable to guide lubrication fluid from the connecting pins (14) to shaft bearings (10) rotatable supporting driveshaft (3) in a housing (11) of the hydrostatic bent axis piston unit (1).

In summary the invention provides for a simple universal/synchronizing joint which due to its low number of parts is economic in its manufacturing and is as well robust during operation of, e.g., the hydrostatic bent axis axial piston unit or an axle of a vehicle with independent suspension. The inventive synchronizing joint also enables an automatic assembly of the inventive universal/synchronizing joint to the hydrostatic bent axis axial piston unit or the vehicle axle, as the rollers 17 are prevented from falling-down of the roller carriers 16 by means of embossed areas 19 brought up as stoppers for the rollers 17 at the distal ends of the roller carriers 16. Furthermore, as grease for "gluing" the rollers 17 to the roller carriers 16 is not necessary any longer, the hydraulic fluid in hydrostatic bent axis axial piston units will not be contaminated by grease and dirt wash-up from the synchronizing joint 2.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A synchronizing joint for an angularly adjustable drive-connection of a cylinder block and a driveshaft of a hydrostatic bent axis piston unit,
    wherein the synchronizing joint has a shank which is rotatable about its longitudinal axis defining a joint axis,
    wherein, on both ends of the shank, roller carriers project radially and basically perpendicular to the joint axis,
    wherein on each roller carrier a roller is provided rotatable around a roller axis, and
    wherein the rollers are secured in axial direction against slipping-off of the roller carriers by means of an embossed area located axially outside of the roller on the respective distal end portion of the roller carrier,
    wherein the embossed area includes material added to the distal end portion of the roller carrier.

2. The synchronizing joint according to claim 1, wherein the embossed area is a welding point, a welding dash or a welding line along the circumferential direction of the roller carrier or a burr.

3. The synchronizing joint according to claim 1, wherein the embossed area is brought up by means of soldering, welding, sputtering, gluing or any other technology increasing locally the diameter of the roller carrier.

4. The synchronizing joint according to claim 1, wherein the synchronizing joint is embodied at least on one end as a tripod joint.

5. The synchronizing joint according to claim 1, wherein at each axial end of the shank concave seats for receiving connecting pins are formed.

6. The synchronizing joint according to claim 1, wherein the rollers are made of plastic material.

7. The synchronizing joint according to claim 1, wherein the external circumferential surface of the rollers shows a convex shape.

8. The synchronizing joint according to claim 1, wherein the roller carriers are integrally formed with the shank.

9. The synchronizing joint according to claim 1, wherein the shank comprises a longitudinal bore capable to guide lubrication fluid along the joint axis.

10. A hydrostatic bent axis piston unit having a cylinder block and a driveshaft connected by synchronizing joint according to claim 1, usable as hydrostatic bent axis piston pump or hydrostatic bent axis piston motor.

11. The hydrostatic bent axis piston unit according to claim 10,
wherein each end of the shank comprises a concave seat for receiving connection pins, and
wherein each end of the connection pins shows a convex or spherical head for being capable to support the synchronizing joint in an angular position with respect to the cylinder block axis and/or in angular position with respect to the driveshaft axis.

12. The hydrostatic bent axis piston unit according to claim 10, wherein the connecting pins comprise through holes capable to guide lubrication fluid from the cylinder block to the longitudinal bore in the shank and from the shank to the driveshaft and vice versa.

13. The hydrostatic bent axis piston unit according to claim 12, wherein radial bores in the driveshaft are capable to guide lubrication fluid from the connecting pins to shaft bearings rotatable supporting driveshaft in a housing of the hydrostatic bent axis piston unit.

14. The hydrostatic bent axis piston unit according to claim 10, wherein the hydrostatic bent axis piston unit is of the variable adjustable displacement type of construction.

15. The hydrostatic bent axis piston unit according to claim 14, wherein the cylinder block of the hydrostatic bent axis piston unit can be swivelled to positive and negative displacement angels by means of an adjustment unit.

16. A universal joint for an angularly adjustable drive-connection of two driveshafts,
having a shank which is rotatable about its longitudinal axis defining a joint axis,
wherein on at least one end of the shank a roller carrier projects radially and basically perpendicular to the joint axis,
wherein on the at least one roller carrier a roller is provided rotatable around a roller axis,
wherein the roller is secured in axial direction of the roller axis against slipping-off of the roller carrier by means of an embossed area located axially outside of the roller on the distal end portion of the roller carrier,
wherein the roller carriers are integrally formed with the shank, and
wherein the embossed area is brought up by means of laser application to locally increase the diameter of the roller carrier.

17. A universal joint for an angularly adjustable drive-connection of two driveshafts,
having a shank which is rotatable about its longitudinal axis defining a joint axis,
wherein on at least one end of the shank a roller carrier projects radially and basically perpendicular to the joint axis,
wherein on the at least one roller carrier a roller is provided rotatable around a roller axis, and
wherein the roller is secured in axial direction of the roller axis against slipping-off of the roller carrier by means of an embossed area located axially outside of the roller on the distal end portion of the roller carrier,
wherein the roller carriers are integrally formed with the shank, and
wherein the embossed area includes material added to the distal end portion of the roller carrier.

18. The universal joint according to claim 17, wherein the embossed area is a welding point, a welding dash, a welding line or a burr along the circumferential direction of the roller carrier.

19. The universal joint according to claim 17, wherein the shank comprises a longitudinal bore capable to guide lubrication fluid along the joint axis.

20. The universal joint according to claim 17, wherein the universal joint is embodied at least on one end as a tripod joint.

21. The universal joint according to claim 17, wherein at each axial end of the shank concave seats for receiving connecting pins are formed.

22. The universal joint according to claim 17, wherein the rollers are made of plastic material.

23. The universal joint according to claim 17, wherein the external circumferential surface of the rollers shows a convex shape.

* * * * *